F. SHEPIS.
AUTOMOBILE SAFETY APPLIANCE.
APPLICATION FILED AUG. 12, 1919.

1,408,227.

Patented Feb. 28, 1922.

Witness:
C. S. Evans

INVENTOR.
FRANK SHEPIS.
BY White & Prost
his ATTORNEYS.

UNITED STATES PATENT OFFICE.

FRANK SHEPIS, OF SAN FRANCISCO, CALIFORNIA.

AUTOMOBILE SAFETY APPLIANCE.

1,408,227.

Specification of Letters Patent. Patented Feb. 28, 1922.

Application filed August 12, 1919. Serial No. 317,032.

*To all whom it may concern:*

Be it known that I, FRANK SHEPIS, a citizen of the United States, and a resident of the city and county of San Francisco and State of California, have invented a new and useful Automobile Safety Appliance, of which the following is a specification.

My invention relates to a safety appliance for controlling the operation of the steering mechanism of an automobile.

A great many accidents have occurred with automobiles of a certain type, due to the locking of the steering gear in making a sharp turn. In automobiles of this type it is possible to operate the steering gear so that certain parts of the gear will move past center and temporarily lock the steering gear against a recovery movement or further operation. This often happens when the driver is called upon to turn sharply, with the frequent result that the vehicle is overturned or runs off the road. It is an object of my present invention to prevent such accidents and I accomplish this by providing an inexpensive and reliable appliance which may be readily attached to the automobile and which will prevent the locking of the steering mechanism by limiting its movement to a range within which such locking action is impossible.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

Figure 1:
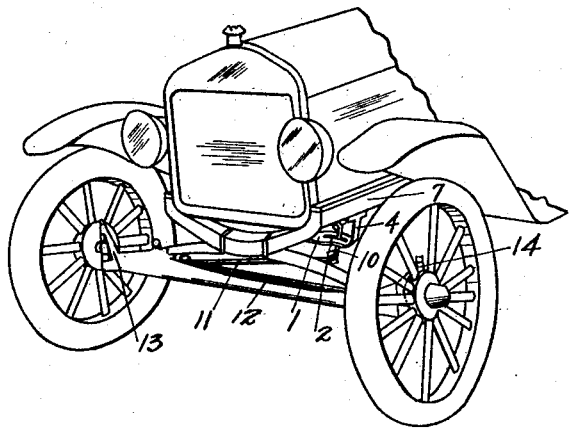
Figure 1 is a fragmentary perspective view of an automobile showing my safety appliance attached thereto.
Figure 2:
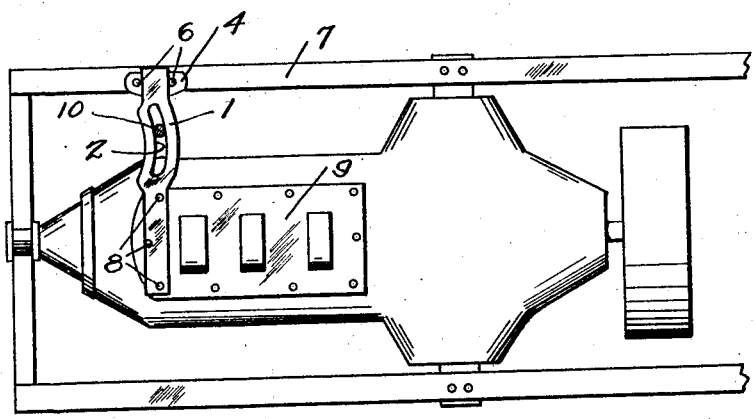
Figure 2 is a bottom view of a portion of an automobile and steering gear showing my appliance associated therewith.
Figure 3:
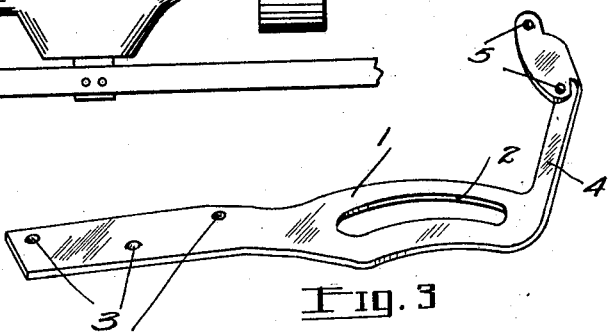
Figure 3 is a perspective view of the appliance detached from the automobile.

In carrying out my invention I employ a recessed member preferably in the form of a plate and provided with an angularly extending integral arm at one end. The other end of the plate is provided with bolt holes to permit its being attached preferably to the crank case of the engine, and the arm is similarly provided with bolt holes to adapt it for attachment to the chassis of the automobile. When so secured in position, the steering arm of the automobile steering gear is engaged in the recess, and its movement is determined by the length of the recess, which is such that the steering arm cannot be moved past center to cause the mechanism to lock.

In construction my invention comprises a body member or plate 1 having a longitudinal recess 2 therein intermediate its ends. One end of the plate is provided with bolt holes 3, and at the other an attaching arm 4 is provided, which is integral with the plate and extends at right angles thereto. The arm is turned inwardly at the upper end and provided with bolt holes 5.

The arm is secured by bolts 6 to the automobile chassis 7 and the other end of the plate opposite to the arm 4 is secured by bolts 8 to the crank case 9. The body or plate 1 is thus disposed substantially horizontally, and with the recess 2 beneath the steering arm 10 of the steering gear. This arm 10 extends through the recess 2 and works freely back and forth therein. Since the arm moves in a slight arc, the recess is preferably given a similar curve. The steering gear shown is of a well known type, and need not be described in detail. The arm 10 is connected with the drag link 11 and this link is connected with the drag link 12 which connects the steering knuckles 13 and 14. The arm 10 moves to the right or left in steering the automobile and will engage the ends of the recess 2 and its movement will be determined thereby. The recess is of such length that the turning radius is not unduly restricted.

From the foregoing it will be seen that I have provided a simple and reliable safety device that may be quickly and easily attached without necessitating any changes in the construction of the vehicle.

I claim:

1. A safety appliance adapted for association with the steering gear of an automobile, comprising a plate having a recess therein in which the steering arm of said gear is adapted to reciprocate for limiting the movement of said gear, and being provided with means to adapt the plate to be secured to the crank case of the automobile, and an arm on said plate provided with means to adapt it to be secured to the frame of the automobile.

2. The combination with a vehicle having a motor crank case, a frame on which the case is mounted, and a steering shaft having a lever arm movable between the frame and the case, of a safety appliance comprising a plate attached at one end to the frame and at the other end to the said case said plate having a longitudinally cut-away portion to receive, and limit the movement of, the steering arm.

3. The combination with a vehicle having a motor crank case, a frame on which the case is mounted, and a steering shaft having a lever arm movable between the frame and the case, of a safety appliance comprising a plate attached at one end to the frame and at the other end to the said case and longitudinally slotted to receive, and limit the movement of, the steering arm; one end of the plate being bent up at an angle to reach the said frame and having an inwardly turned end perforated to be fastened to the frame.

In testimony whereof, I have hereunto set my hand at San Francisco, California, this 1st day of August, 1919.

FRANK SHEPIS.

In presence of—
W. W. HEALEY,
C. S. EVANS.